ved July 21, 1970

3,520,953
VINYL CHLORIDE RESIN COMPOSITION

Katsumi Sugimoto, Tokyo, and Shiro Tanaka and Hiroya Fujita, Yokohama-shi, Japan, assignors to The Japanese Geon Co., Ltd., Tokyo, Japan
No Drawing. Filed Aug. 11, 1967, Ser. No. 659,858
Claims priority, application Japan, Aug. 11, 1966, 41/52,309
Int. Cl. C08f 29/24
U.S. Cl. 260—890    2 Claims

ABSTRACT OF THE DISCLOSURE

An intimate blend of (A) 100 parts by weight of a mixture of (1) from 90% to 50% by weight of a vinyl chloride resin and (2) from 10% to 50% by weight of a copolymer of from 5% to 40% by weight of styrene, from 5% to 20% by weight of acrylonitrile, from 30% to 80% by weight of methyl methacrylate and from 10% to 45% by weight of α-methylstyrene and (B) from 0 to 30 parts by weight of at least one impact strength enhancing agent selected from the group consisting of butadiene-containing polymers, chlorinated polyethylene and clorosulfonated polyethylene.

---

This invention relates to a vinyl chloride resin composition having excellent heat distortion properties and, more particularly, it is concerned with a colorless, transparent rigid vinyl chloride resin composition having excellent heat distortion and good shock resisting properties and excellent processability.

BACKGROUND OF THE INVENTION

Vinyl chloride resins have now come into widespread use in a large variety of applications as rigid synthetic resinous molding materials because of their characteristics in that they provide colorless, transparent shaped articles and have an excellent chemical resistance and a low gas permeability. However, there are a fairly large variety of applications in which the material may not conveniently be used in spite of its desirable characteristics as set forth above because of its disadvantages, namely, a relatively low heat distortion temperature, a poor processability and an insufficient impact strength. For instance, the material may not suitably be used as a material for making industrial reservoir tanks and pipings in which the material is required to have a high heat distortion property together with chemical resistance and in applications as a material for making containers and bottles for foodstuffs in which the material is required to be not only air impermeable as to prevent the contents from rotting but also thermally resistant as to withstand pasteurization and hot pack at high temperatures.

Hitherto, there have been many proposals with respect to elimination of such disadvantages of the vinyl chloride resin. For instance, as vinyl chloride resin materials having improved thermal resisting properties, there has been proposed (1) chlorinated vinyl chloride resins, (2) vinyl chloride polymerizates prepared in a low temperature polymerization process and (3) blends of vinyl chloride resin and poly-α-methylstyrene having an improved processability (4) blends of vinyl chloride resin with a styrene-acrylonitrile copolymer, (5) blends with a styrene-methyl methacrylate copolymer and (6) blends with a methyl methacrylate-alkyl acrylate copolymer, and as those having an enhanced impact strength (7) blends of vinyl chloride resin with a butadiene-containing polymer, (8) blends with a chlorinated polyethylene and (9) blends with a chlorosulfonated polyethylene. It also has been proposed for eliminating the above three disadvantages at the same time to incorporate (10) a styrene-acrylonitrile copolymer and a chlorosulfonated polyethylene in vinyl chloride resin as disclosed in Japanese patent publication No. 8,674/1965, and to incorporate (11) a styrene-acrylonitrile-butadiene terpolymer in a chlorinated polyvinyl chloride as disclosed in Japanese patent publication No. 590/66. However, the improvements brought about in the prior art are insufficient and suffer from the defect of sacrificing the desirable properties of vinyl chloride resin especially colorlessness and transparency. Namely, in case of (10), the improvement in thermal resistance is not entirely sufficient and the resulting composition has a poor transparency. In case of (11), the resulting composition has a sufficiently improved thermal resistance but an unsatisfactory processability owing to a poor processability of the chlorinated polyvinyl chloride and it is impossible to obtain colorless and transparent product based on the chlorinated polyvinyl chloride.

It is an object of the present invention to provide a rigid vinyl chloride resin composition which has excellent heat distortion property and good processing properties. Another object is to provide a rigid vinyl chloride resin composition having excellent heat distortion properties, good processing properties and high impact resistance. The above and other objects will be apparent from the following description.

BRIEF DESCRIPTION OF THE INVENTION

We have made many investigations for the purpose of overcoming those shortcomings inherent in such prior arts and have discovered that a composition consisting of (A) 100 parts by weight of a mixture of (1) from 90% to 50% by weight of a vinyl chloride resin and (2) from 10% to 50% by weight of a styrene-acrylonitrile-methyl methacrylate-α-methylsyrene interpolymer with (B) from 0 to 30 parts by weight of an impact strength enhancing agent is colorless and transparent, excellent in thermal resisting and shock resisting properties, processable or fabricable without any difficulty in, e.g., injection molding, extrusion molding or vacuum forming processes, and especially excellent in thermal resisting property and fully serves the purposes of the present invention.

DETAILED DESCRIPTION OF THE INVENTION

The vinyl chloride resin used in the present invention may be polyvinyl chloride itself or a copolymer of at least 80% by weight of vinyl chloride with at least one other copolymerizable monomer.

The styrene-acrylonitrile-methyl methacrylate-α-methylstyrene interpolymer used in the present invention may be a copolymer consisting of from 5 to 40% by weight of styrene, from 5 to 20% by weight of acrylonitrile from 30% to 80% by weight of methyl methacrylate and from 10% to 45% by weight of α-methylstyrene and, optionally, up to 20% by weight of other copolymerizable mono-olefinic compound. The interpolymer is obtained by merely copolymerizing the monomer mixture. The other copolymerizable mono-olefinic compound includes: vinyl halides such as vinyl chloride, vinyl bromide and vinulidene chloride; vinyl esters such as vinyl acetate and vinyl benzoate; acrylic and α-alkylacrylic acids and alkyl esters thereof such as ethylacrylate, butylacrylate and ethyl methacrylate; acrylo- and methacrylonitriles such as methacrylonitrile and chloroacrylonitrile; aromatic vinyl compounds such as chlorostyrenes and vinylnaphthalenes; alkyl esters of maleic and fumaric acids; vinyl alkyl ethers and vinyl ketones such as vinyl methyl ether, vinyl stearyl ether and isobutyl vinyl ketone; and the like. The mono-olefin compound is not always necessary and the interpolymer of the above four components is sufficient to achieve the object. The preferable interpolymer consists of from 15–30% by weight of styrene, from 5 to 15% by weight of acrylonitrile, from 40 to 60% by weight of methyl methacrylate and from 15 to 30% by weight of α-methylstyrene. The heat distortion temperature of the interpolymer rises but the processability and compatibility to vinyl chloride resin decreases with increasing the amount of α-methylstyrene contained in the interpolymer, so that α-methylstyrene is used in the amount of at most 45% by weight. On the other hand, when the amount is less than 10% by weight, the resulting vinyl chloride resin composition has a low heat distortion temperature.

The styrene in the interpolymer has a significant influence on the processability of the interpolymer and an interpolymer consisting only of acrylonitrile, methyl methacrylate and α-methylstyrene has a very poor processability and, when incorporated in vinyl chloride resin, will afford a composition of a poor processability and, in addition, no improvement in thermal resisting and shock resisting properties will be obtained because of its poor compatibility to vinyl chloride resin. In contrast, an interpolymer containing styrene exhibits a marvelously enhanced processability even if the styrene content is as low as 5% by weight. If the styrene content is more than 40% by weight the interpolymer is difficult to use because of incompatibility with vinyl chloride resin. In cases where the interpolymer is not sufficiently compatible with vinyl chloride resin, the interpolymer will not be mixed intimately with the vinyl chloride resin as in the cases of an interpolymer having a poor processability, so that the resulting composition exhibits poor thermal resistance, impact strength, tensile strength and transparency. Interpolymers free of such defects may be obtained by copolymerizing a monomer mixture so that it contains from 5 to 20% by weight of acrylonitrile and from 30 to 80% by weight of methyl methacrylate. The amount of acrylonitrile should be at most 20% by weight since the interpolymer containing more than 20% by weight of acrylonitrile will usually give a strongly yellow color. Also, the compatibility of the interpolymer to vinyl chloride resin should be supplemented by use of methyl methacrylate. The interpolymer not containing acrylonitrile does not have sufficient compatibility with vinyl chloride resin. Accordingly, its composition with the resin possesses poor tensile properties, transparency, chemical resistance and heat distortion properties.

The vinyl chloride resin composition of the present invention contains as essential components a vinyl chloride resin and interpolymer as mentioned above. However, it is usually incorporated with an impact strength enhancing agent since, in cases of a vinyl chloride resin composition in which a thermal resisting property or a transparency is required, a shock resisting property is also required in a large variety of applications. We have examined various compounds as impact strength enhancing agent and discovered that butadiene-containing copolymers, chlorinated polyethylene and chlorosulfonated polyethylene enhance the impact strength without substantially sacrificing the transparency and thermal resisting properties.

The butadiene-containing polymer includes polymers having a good compatibility with vinyl chloride resin and derived from butadiene and at least one member of the group consisting of styrene, acrylonitrile and methyl methacrylate. Preferred are the graft copolymers obtainable by polymerizing at least one monomer selected from the group consisting of styrene, acrylonitrile and methyl methacrylate in the presence of a homopolymer of butadiene or copolymer of butadiene with another monomer. The desirable graft copolymers contain at least 40% by weight of the butadiene homopolymer or copolymer. These polymers are commercially available under the trade names of Cycolac, Blendex, Kaneace, Kralastic, Hiblen and others. Chlorinated polyethylenes known in market are Plascon, Daiso-CPE, Blaslen and others. Among the chlorosulfonated polyethylenes commercially available is Hypalon. The preferable chlorinated or chlorosulfonated polyethylene contains from 20 to 35% by weight of chlorine.

The reason why the proportion of the interpolymer in the mixture is limited from 10% to 50% by weight is that, when the interpolymer is used in an amount of less than 10% by weight it affords only a slight improvement in thermal resisting property and when used in an amount of more than 50% by weight the desirable properties of the vinyl chloride resin, especially chemical resistance, are adversely affected to a great extent. The reason that the amount of the impact strength enhancing agent is limited at most 30% by weight is that when it is used in the amount exceeding the upper limit the resulting composition has poor strength, hardness, creep resisting properties and chemical resistance to be used practically.

The composition of the present invention thus obtained has the characteristics as follows:

(1) It has an excellent thermal resisting property.

That is to say, it is easy according to the invention to obtain a composition having a heat distortion temperature above 100° C. which is impossible in the prior art methods. Moreover, the composition is excellent in creep resisting properties at high temperatures. The creep property is from 2 to 6 times that of unmodified vinyl chloride resin. The heat distortion temperature of the composition is nearly the arithmetical mean of those of the vinyl chloride and the interpolymer in proportion to their contents. In contrast, the vinyl chloride resin compositions with such as a styrene-acrylonitrile copolymer, a styrene-methyl methacrylate copolymer or ABS resin in prior arts have lower heat distortion temperature than that of their arithmetical mean.

(2) It has an excellent processability.

That is to say, it has a good processability such that is unexpectable in the conventional vinyl chloride resins. It can be easily profile-extrusion molded and injection molded and, in addition, has a very good vacuum forming property which makes it possible to deep draw in vacuum forming processes into shaped articles having uniform wall thickness and good dimensional stability, differing from the conventional vinyl chloride resins. Furthermore, it can be fabricated by blow molding, calendering, pressing and other known fabricating processes more easily than the conventional vinyl chloride resins.

(3) It has an excellent impact strength.

Even if the composition which consists of the vinyl chloride resin and the interpolymer and does not contain any impact strength enhancing agent, it can be conveniently applied in the manufacture of, e.g., containers for foodstuffs where it is unnecessary that the material have higher impact strength than the conventional vinyl chloride resins, since it is comparable with or superior to the latter in impact strength. Moreover, a composition having a high impact strength as high as 10 times that of the conventional vinyl chloride resin can be obtained by incorporating in 100 parts by weight of a mixture (A) of the vinyl chloride resin (1) and the interpolymer (2) up to 30 parts by weight of the impact enhancing agent (B), which is applicable in the manufacture of, e.g., automobile appliances or parts where a high impact strength also is required.

(4) It is colorless and transparent and has a good surface lustre.

This is an important feature of the present invention which is unattainable by the prior proposals. The shaped articles made out of the composition of the present invention are colorless and transparent and, in addition, superior in surface smoothness and lustre to those made out of unmodified vinyl chloride resins.

The composition of the present invention, of course, retains the desirable properties of the vinyl chloride resins with the characteristics as mentioned above.

As illustrated above, the present invention which would bring about great improvements or advantages impossible according to the prior art and overcome the disadvantages in the prior art is accomplished as a result of detailed investigations on the comonomer component of the interpolymer and is characterized by the subtle choice of the comonomer component of the interpolymer.

Although the composition of the present invention can be widely used in making electric appliances, automobile appliances, pipes, containers for foodstuffs and for medical supplies, household necessities and many other articles where thermal resistance is required, it is of great utility especially in making containers and bottles for foodstuffs and medical supplies requiring pasteurization and/or hot packing since the composition does not deform even at a fairly high temperature and has very excellent vacuum forming or blow molding properties and colorlessness, transparency and good surface lustre. In applications such as battery cases and the like, electric appliances and automobile appliances where thermal resistance and shock resistance are required, there is conveniently used a composition containing the impact enhancing agent. Also in this case, the colorlessness and transparency and the good surface lustre increase the commercial value of the shaped articles made out thereof.

The composition of the present invention is easily obtainable by uniformly mixing the components by means of, e.g., mixing rolls, Banbury mixers or extruders. Also it may be prepared in any suitable manner. For instance, the components may be separately dissolved in solvents and the resulting solutions may be admixed. It also is possible to obtain a composition by polymerizing the monomer mixture yielding the interpolymer in the presence of the impact enhancing agent and mixing the resulting polymerizate with the vinyl chloride resin.

The present invention will be now illustrated in more detail by the following examples. Parts and percent are by weight unless otherwise stated.

Example 1

Into a polymerization vessel there were charged 300 parts of water, 3 parts of sodium dodecylbenzenesulfonate, 0.3 part of potassium persulfate, 0.2 part of tertiary dodecylmercaptan and 100 parts of a monomer mixture of the formulation as listed in the following Table 1, the free space of which is then purged with nitrogen. The contents were then maintained at 50° C. with stirring and, after complete reaction of the monomers, the resulting latex was discharged from the vessel. The latex was then coagulated by addition of a calcium chloride solution and the coagulate was washed and dried to recover an interpolymer in finely divided form. The monomer mixture had the proportion as indicated in Table 1, and the resulting interpolymers were indicated as interpolymer sample A, B, C . . . M, respectively.

TABLE 1

| | Sample within the scope of this invention | | | | | | | Controls | | | | | |
|---|---|---|---|---|---|---|---|---|---|---|---|---|---|
| | A | B | C | D | E | F | G | H | I | J | K | L | M |
| Methyl methacrylate | 65 | 45 | 45 | 30 | 30 | 55 | 80 | 70 | 25 | 50 | 25 | 85 | 40 |
| Styrene | 15 | 20 | 10 | 5 | 40 | 30 | 5 | 5 | 5 | 0 | 45 | 5 | 15 |
| Acrylonitrile | 10 | 15 | 15 | 20 | 20 | 5 | 5 | 20 | 20 | 20 | 20 | 0 | 25 |
| α-Methylstyrene | 10 | 20 | 30 | 45 | 10 | 10 | 10 | 5 | 50 | 30 | 10 | 10 | 20 |

100 parts of a mixture of 30% by weight of the interpolymer thus obtained and 70% by weight of a vinyl chloride resin (Polyvinyl chloride of a polymerization degree of 1450, sold by the Japanese Geon Co. under the trade name of Geon-101EP) was added with 20 parts of an impact strength enhancing agent (and ABS resin, sold by the Japanese Geon Co. under the trade name of Hiblen B-202), 2 parts of an organotin maleate stabilizer (sold under the trade name of Stan BM) and 0.5 part of calcium stearate and kneaded on a roll at 160° C. for 10 minutes. The resulting sheet was hot pressed at 165° C. and then cut into various sizes and subjected to test of physical properites. The results obtained are given in the following Table 2.

TABLE 2

| Stock | Interpolymer sample | Heat distortion temp. (° C.) | Creep (percent) 60° C. a week | Creep (percent) 80° C. a day | Processability | Charpy impact strength (Kg.-cm./sq. cm.) | Transparency | Color | Tensile strength at 20° C. (Kg./sq. mm.) | Durometer hardness "D" at 20° C. |
|---|---|---|---|---|---|---|---|---|---|---|
| 1-1 | A | 96 | 97 | 154 | Excellent | 19.5 | Excellent | Colorless | 6.2 | 83 |
| 1-2 | B | 102 | 64 | 122 | do | 21.7 | do | do | 6.0 | 83 |
| 1-3 | C | 108 | 53 | 101 | do | 18.8 | do | do | 6.0 | 83 |
| 1-4 | D | 112 | 26 | 86 | Good | 16.5 | Good | Slightly yellow | 6.1 | 83 |
| 1-5 | E | 95 | 90 | 148 | Excellent | 18.9 | Excellent | do | 6.0 | 82 |
| 1-6 | F | 96 | 95 | 163 | do | 23.8 | do | Colorless | 6.2 | 84 |
| 1-7 | G | 97 | 82 | 152 | Good | 19.8 | do | do | 6.1 | 83 |
| 1-8 | H | 77 | 153 | >200 | Good | 18.3 | Excellent | Light yellow | 6.1 | 84 |
| 1-9 | I | 82 | 121 | >200 | do | 5.6 | Poor | Milky | 4.3 | 84 |
| 1-10 | J | 79 | 142 | >200 | Poor | 7.1 | Good | Slightly yellow | 5.2 | 83 |
| 1-11 | K | 76 | 159 | >200 | Excellent | 4.2 | Poor | Milky | 4.8 | 85 |
| 1-12 | L | 78 | 146 | >200 | Good | 5.9 | do | do | 5.0 | 84 |
| 1-13 | M | 103 | 82 | 185 | Excellent | 20.5 | Excellent | Yellow | 6.2 | 82 |
| 1-14 | Vinyl chloride resin alone | 76 | 168 | >200 | Fair | 3.4 | do | Colorless | 5.9 | 82 |

NOTE.—Test methods were as follows: Heat distortion temperature=JIS K6745; Impact strength=JIS K6745; Tensile strength=JIS K6741; Hardness ASTM D-785; Creep=Elongation (percent) under a tension of 2 kg./sq. mm.

While the stocks of the present invention (from 1-1 to 1-7) were of good quality in all respects, the control stock (1-10) had a poor processability since it contained no styrene in the interpolymer and exhibited a rubbery behavior on the roll, it was difficult to cut-back the band and the roll sheet taken out of the roll had a wrinkled surface. A stock containing 45% styrene (1-11), one containing 50% of α-methylstyrene (1-9) and one not containing acrylonitrile (1-12) in the interpolymer had not satisfactory head distortion temperature, creep resistances, impact strengths, transparencies and tensile strengths because of poor compatibility of the interpolymer to vinyl chloride resin. Further, a stock containing 25% of acrylonitrile in the interpolymer (1-13) was strongly discolored to yellow and one of the α-methylstyrene content in the interpolymer of 5% (1-8) had a low heat distortion temperature and a poor creep resistance.

Example 2

Various stocks were prepared varying the proportions of the three components, of which physical properties were observed, in the manner as in Example 1. The results are indicated in the following Table 3.

As the interpolymer there was used the interpolymer sample B in Example 1.

TABLE 3

| Stock | Vinyl chloride resin (101EP) | Inter-polymer, B | Impact enhancing agent (Hiblen B-202) | Heat distortion temp. (°C.) | Creep at 60° C. a week (percent) | Processability | Charpy impact strength (Kg.-cm./sq. cm.) | Transparency | Color | Tensile strength (Kg./sq. mm.) | Durometer hardness "D" | Chemical resistance |
|---|---|---|---|---|---|---|---|---|---|---|---|---|
| 2-1 | 100 | 0 | 0 | 76 | 168 | Fair | 3.4 | Excellent | Colorless | 5.9 | 82 | Excellent. |
| 2-2 | 95 | 5 | 0 | 79 | 141 | Fair | 3.6 | do | do | 6.1 | 83 | Excellent. |
| 2-3 | 95 | 5 | 10 | 78 | | Good | 14.5 | do | do | 5.8 | 82 | Do. |
| 2-4 | 95 | 5 | 20 | 78 | 148 | do | 24.4 | do | do | 5.9 | 82 | Do. |
| 2-5 | 95 | 5 | 30 | 77 | | do | 28.6 | do | do | 5.7 | 80 | Do. |
| 2-6 | 95 | 5 | 40 | 72 | 187 | Fair | (1) | do | do | 5.2 | 77 | Good. |
| 2-7* | 90 | 10 | 0 | 87 | 104 | Good | 4.8 | Excellent | Colorless | 5.9 | 82 | Excellent. |
| 2-8* | 90 | 10 | 10 | 85 | | do | 16.4 | do | do | 6.0 | 83 | Do. |
| 2-9* | 90 | 10 | 20 | 85 | 104 | Excellent | 22.6 | do | do | 6.1 | 82 | Do. |
| 2-10* | 90 | 10 | 30 | 80 | | Good | 27.3 | do | do | 5.8 | 81 | Do. |
| 2-11 | 90 | 10 | 40 | 77 | 131 | Fair | (1) | do | do | 5.1 | 78 | Good. |
| 2-12* | 70 | 30 | 0 | 104 | 60 | Excellent | 4.5 | Excellent | Colorless | 6.2 | 82 | Excellent. |
| 2-13* | 70 | 30 | 10 | 102 | | do | 10.1 | do | do | 6.2 | 83 | Do. |
| 2-14* | 70 | 30 | 20 | 102 | 64 | do | 21.7 | do | do | 6.0 | 83 | Do. |
| 2-15* | 70 | 30 | 30 | 101 | | Good | 29.7 | do | do | 5.7 | 80 | Good. |
| 2-16 | 70 | 30 | 40 | 90 | 105 | Fair | (1) | do | do | 5.1 | 78 | Fair. |
| 2-17* | 50 | 50 | 0 | 109 | 48 | Good | 4.0 | Excellent | Colorless | 6.4 | 83 | Excellent. |
| 2-18* | 50 | 50 | 10 | 110 | | Excellent | 13.9 | do | do | 6.2 | 82 | Good. |
| 2-19* | 50 | 50 | 20 | 108 | 49 | do | 20.5 | do | do | 6.0 | 83 | Do. |
| 2-20* | 50 | 50 | 30 | 107 | | Good | 26.3 | do | do | 5.7 | 81 | Do. |
| 2-21 | 50 | 50 | 40 | 97 | 80 | Fair | 28.2 | Good | do | 5.2 | 78 | Fair. |
| 2-22 | 40 | 60 | 0 | 115 | 18 | Good | 3.7 | Excellent | Colorless | 6.3 | 84 | Good. |
| 2-23 | 40 | 60 | 10 | 115 | | do | 5.1 | do | do | 6.4 | 84 | Fair. |
| 2-24 | 40 | 60 | 20 | 113 | 18 | Excellent | 7.2 | Good | do | 6.2 | 82 | Do. |
| 2-25 | 40 | 60 | 30 | 112 | | Good | 12.0 | do | do | 6.0 | 81 | Bad. |
| 2-26 | 40 | 60 | 40 | 104 | 69 | Fair | 17.4 | do | do | 5.7 | 79 | Bad. |

1 Not destructed.
NOTE.—Starred (*) are stocks of the present invention.

The chemical resistance was determined by observing the change in the surface appearance during immersion of each stock at 60° C. for a week in each of a 30% aqueous caustic soda, a 50% aqueous sulfuric acid, 40% aqueous calcium chloride, methanol and glycerol. All of the stocks of the present invention (starred) exhibited good results. Among the control stocks (unstarred), one containing 40 parts of the impact enhancing agent had poor heat distortion temperature, creep resistance, processability, tensile strength and hardness, one containing 60% of the interpolymer had a poor chemical resistance and one having an interpolymer content of 5% exhibited a slight rise of heat distortion temperature.

Example 3

The results obtained by the tests in the similar manner as in Examples 1 and 2 on the stocks prepared using as the impact enhancing agent a chlorinated polyethylene (Elaslen 401 A, sold by Showa Denko Co.) and a chlorosulfonated polyethylene (hypalon 40, sold by E. I. du Pont de Nemours and Co.) are indicated in the following Table 4.

What is claimed is:

1. A vinyl chloride resin composition having an excellent heat distortion property consisting essentially of a mixture of:
    (1) from 90% to 50% by weight of a vinyl chloride resin and
    (2) from 10% to 50% by weight of an interpolymer consisting of
        5% to 40% by weight of styrene.
        5% to 20% by weight of acrylonitrile,
        30% to 80% by weight of methyl methacrylate, and
        10% to 45% by weight of α-methylstyrene.

2. The composition of claim 1 also including in admixture therewith from 0 part to 30 parts by weight, per 100 parts by weight of said mixture of at least one impact strength enhancing agent selected from the group consisting of butadiene-containing polymers, chlorinated polyethylene and chlorosulfonated polyethylene.

(References on following page)

TABLE 4

| Stock | Vinyl chloride resin (101EP) | Inter-polymer, B | Impact enhancing agent (a) | (b) | (c) | Heat distortion temp. (°C.) | Creep at 60° C. a week | Processability | Charpy impact strength (Kg-cm./sq. cm.) | Transparency | Color | Tensile strength (Kg./sq. mm.) | Durometer hardness "D" | Chemical resistance |
|---|---|---|---|---|---|---|---|---|---|---|---|---|---|---|
| 3-1* | 70 | 30 | 10 | | | 102 | | Excellent | 10.1 | Excellent | Colorless | 6.2 | 83 | Excellent. |
| 3-2* | 70 | 30 | 20 | | | 102 | 64 | do | 21.7 | do | do | 6.0 | 83 | Do. |
| 3-3* | 70 | 30 | 30 | | | 101 | | Good | 29.7 | do | do | 5.7 | 80 | Good. |
| 3-4* | 70 | 30 | 40 | | | 90 | 105 | Fair | (1) | do | do | 5.1 | 78 | Fair. |
| 3-5* | 70 | 30 | | 10 | | 104 | | Excellent | 9.5 | Excellent | Colorless | 6.2 | 83 | Excellent. |
| 3-6* | 70 | 30 | | 20 | | 103 | 51 | Good | 18.2 | Good | do | 6.1 | 82 | Do. |
| 3-7* | 70 | 30 | | 30 | | 102 | | do | 24.1 | do | do | 6.1 | 82 | Do. |
| 3-8 | 70 | 30 | | 40 | | 94 | 96 | Bad | 28.3 | Fair | do | 6.0 | 81 | Do. |
| 3-9* | 70 | 30 | | | 10 | 102 | | Good | 8.3 | Excellent | Slightly yellow. | 6.1 | 82 | Excellent. |
| 3-10* | 70 | 30 | | | 20 | 103 | 50 | do | 16.5 | Good | do | 6.2 | 81 | Do. |
| 3-11* | 70 | 30 | | | 30 | 102 | | do | 20.0 | do | do | 6.0 | 81 | Do. |
| 3-12 | 70 | 30 | | | 40 | 95 | 98 | Bad | 23.2 | Fair | do | 6.0 | 81 | Good. |

1 Not destructed.
NOTE.—Starred (*) are stocks of the present invention.
(a) Hiblen B202, (b) Elaslen 401A, and (c) Hypelon 40.

References Cited

UNITED STATES PATENTS

| | | | |
|---|---|---|---|
| 2,988,530 | 6/1961 | Slocombe et al. | 260—898 |
| 3,053,800 | 9/1962 | Grabowski et al. | 260—898 |
| 3,149,183 | 9/1964 | Salyer et al. | 260—898 |
| 3,268,625 | 8/1966 | Jones et al. | 260—80.78 |

FOREIGN PATENTS 571,254  2/1959  Canada.

SAMUEL H. BLECH, Primary Examiner
M. J. TULLY, Assistant Examiner

U.S. Cl. X.R.

260—29.6, 80.78, 876, 897, 898, 899